United States Patent [19]

Biass

[11] Patent Number: 5,022,125
[45] Date of Patent: Jun. 11, 1991

[54] CLAMPING ASSEMBLY WITH SELF-CLAMPING JAWS, IN PARTICULAR FOR A LINEAR HYDRAULIC WINCH

[75] Inventor: David Biass, Geneva, Switzerland

[73] Assignee: Cibeles International, Inc., Panama

[21] Appl. No.: 507,982

[22] Filed: Apr. 11, 1990

[30] Foreign Application Priority Data

Apr. 20, 1989 [FR] France ................................ 89 05256

[51] Int. Cl.⁵ .............................................. F16G 11/00
[52] U.S. Cl. ................................ 24/136 R; 24/136 A; 294/102 R
[58] Field of Search ............ 24/136 R, 136 K, 136 L, 24/503; 254/264, 254, 228; 403/211; 294/102.2

[56] References Cited

U.S. PATENT DOCUMENTS

| | | | |
|---|---|---|---|
| 749,896 | 1/1904 | Brown | 24/136 R |
| 875,121 | 12/1907 | Shryock | 24/136 R |
| 1,159,096 | 11/1915 | Rigby | 24/136 R |
| 1,478,950 | 12/1923 | Gilliam | 24/136 R |
| 3,776,586 | 12/1973 | Ahlgren et al. | 24/136 R |
| 4,381,584 | 5/1983 | Coyle, Sr. | 294/102.2 |
| 4,615,509 | 10/1986 | Biass | 254/264 |

FOREIGN PATENT DOCUMENTS

| | | |
|---|---|---|
| 9786 | 5/1880 | Fed. Rep. of Germany . |
| 3329152 | 11/1984 | Fed. Rep. of Germany . |
| 2491991 | 4/1982 | France . |
| 2146091 | 4/1985 | United Kingdom . |

Primary Examiner—Victor N. Sakran

[57] ABSTRACT

The clamping assembly comprises a body having an elongate passage which, in use, receives an elongate object to be clamped, and which has two mutually facing inclined surfaces, and a pair of wedge-shaped jaws movably mounted in said passage to move between a first position in which the jaws clamp said object and a second position in which they release the object. Two sets of rollers form respective rolling paths for corresponding ones of the jaws, with the rollers in each set being supported and rotatably mounted in respective mounting frames capable of sliding movement relative to the corresponding jaw and relative to the body. A compression spring is interposed between each jaw and the mounting frame of the corresponding set of rollers. Each spring has one end bearing against the associated jaw in order to urge it towards its first position and has its opposite end bearing against an opposing thrust surface provided at one end of said mounting frame to urge the mounting frame into contact with an abutment provided on said body.

4 Claims, 2 Drawing Sheets

CLAMPING ASSEMBLY WITH SELF-CLAMPING JAWS, IN PARTICULAR FOR A LINEAR HYDRAULIC WINCH

The present invention relates to a gripping or clamping assembly with self-clamping jaws, said assembly comprising: a body having an elongate passage which, in use, receives an elongate object to be clamped, said passage having two mutually facing surfaces with at least one of said surfaces being inclined to the longitudinal axis of said passage; a pair of jaws, at least one of which is wedge-shaped, said jaws being mounted to move generally longitudinally in said passage between a first position in which the jaws clamp said object and a second position in which they release the object; and a set of rollers disposed between each jaw and a respective one of the two mutually facing surfaces of said passage to form a rolling path for the associated jaw, the rollers in each set being supported and rotatably mounted at their ends in a mounting frame capable of sliding movement relative to the corresponding jaw and relative to said body in a direction parallel to the longitudinal direction of the movment of the corresponding jaw.

BACKGROUND OF THE INVENTION

Clamping assemblies of the above-mentioned type are used particularly, but not exclusively, in linear hydraulic winches. In this context, reference may be made, for example, to U.S. Pat. No. 4 615 509 or to the corresponding European patent No. 0 220 968, or indeed to the following U.S. Pat. Nos.: 2 400 514, 3 758 922, 3 762 512, and 4 381 584. A first spring is usually associated with each set of rollers and acts on the mounting frame of said rollers in order to preposition or preset the rollers in a position such that when the associated jaw moves from its second position towards its first position, i.e. towards the clamping position, then the set of rollers is capable of accompanying the jaw as it moves, by rolling over one of two opposite surfaces of the passages through the body of the clamping assembly and over the facing surface of the jaw (see U.S. Pat. Nos. 2 400 514 and 3 762 512). In addition, each jaw is sometimes also associated with a respective second spring different from the first spring, said second spring usually being interposed between the associated jaw and the body of the clamping assembly in such a manner as to urge the jaw towards its first or clamping position.

In addition, it is sometimes also necessary to be able to control the jaws positively, e.g. in order to hold them in the second or un-clamped position. This may occur, for example, when the clamping assembly is used in a hydraulic winch which is required to be capable not only of exerting traction on a cable for raising a load, but also of paying out the cable progressively in order to lower the load. To this end, proposals have already been made to associate at least one auxiliary hydraclic actuator with the two jaws of the clamping assembly, such that when the actuator is actuated it pushes the two jaws towards their second position (see U.S. Pat. No. 4 615 509, for example). When the second above-mentioned spring is provided, it is then sufficient to use a single-acting hydraulic actuator for said auxiliary jaw-controlling actuator. However, when second springs are not provided, it is necessary to use a double-acting actuator for the auxiliary hydraulic actuator, and this requires a hydraulic fluid distributor to be used which is more complicated than would be required for a single-acting actuator.

The object of the present invention is therefore to provide a clamping assembly in which it is possible to use a single spring for each jaw while nevertheless providing the functions which used to be provided by the above-mentioned first and second springs, so that if the jaws are to be controlled positively, it is still possible to use an auxiliary actuator which is a single-acting actuator in spite of using only one spring.

SUMMARY OF THE INVENTION

To this end, the clamping assembly of the present invention has a compression spring interposed between each jaw and the mounting frame of the associated set of rollers, each spring bearing at one end against the associated jaw to urge it towards its first position and at its other end against an opposing thrust surface provided at one end of said mounting frame in order to urge the mounting frame into contact with an abutment provided on said body.

In a preferred embodiment of the present invention, each jaw includes a cylindrical hole whose axis lies parallel to the rolling path defined by the set of rollers associated with the jaw, and the compression spring is a helical spring which is disposed inside the said cylindrical hole.

BRIEF DESCRIPTION OF THE DRAWINGS

An embodiment of the invention is descibed by way of example with reference to the accompanying drawings, in which.

DETAILED DESCRIPTION

Figure 1:
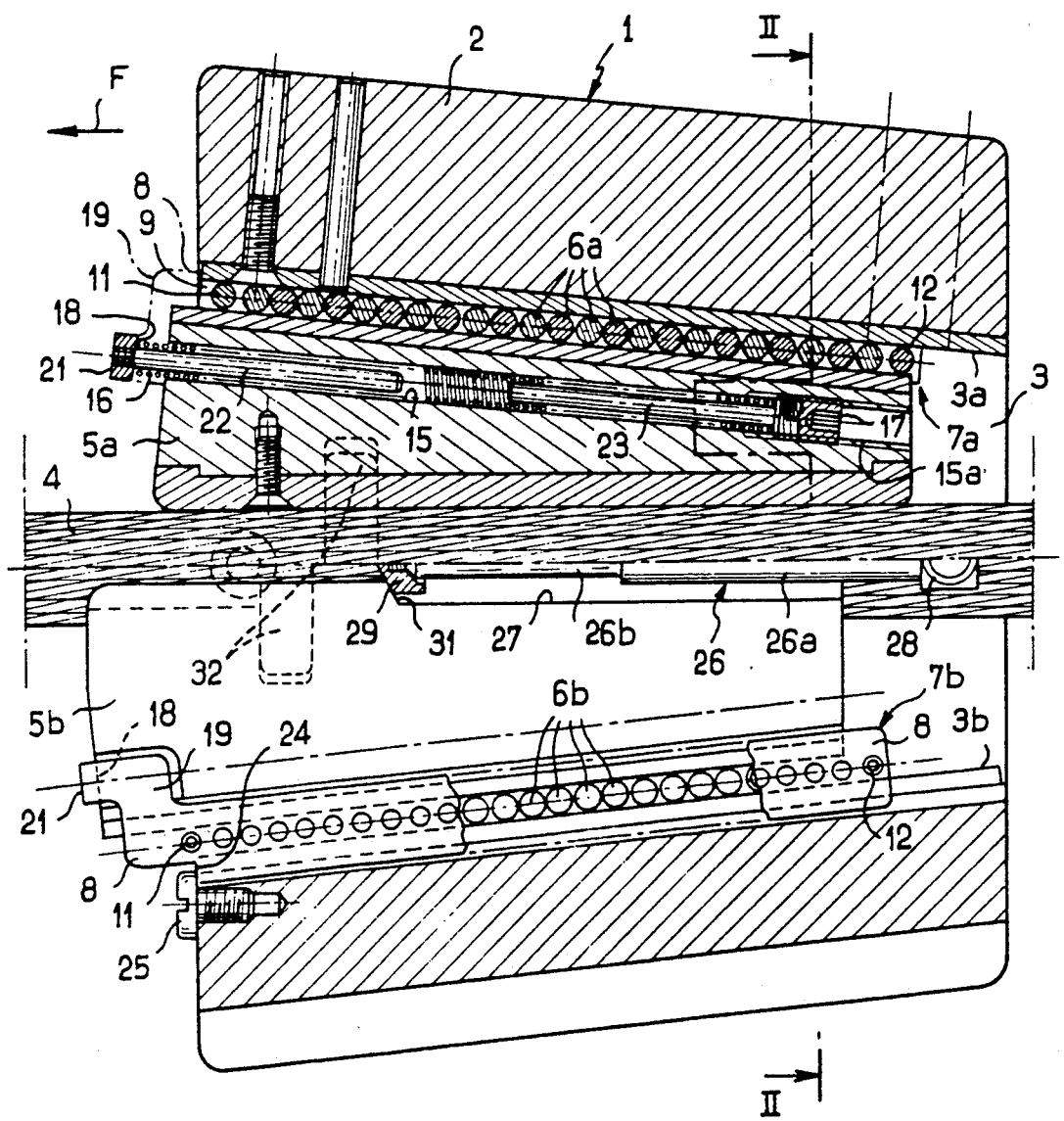
FIG. 1 is a longitudinal section view on line I—I of FIG. 2, showing a clamping assembly of the present invention.
Figure 2:
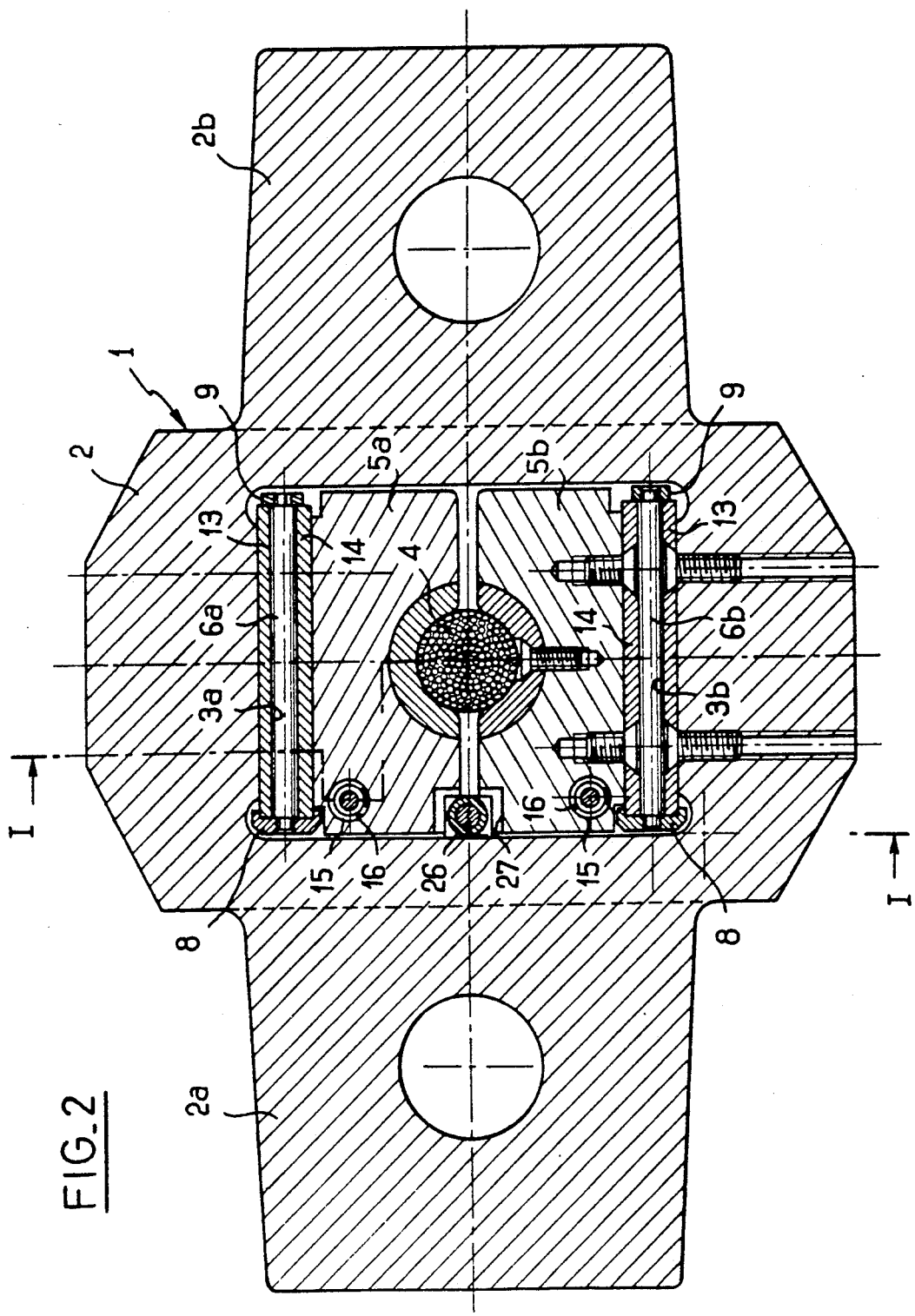
FIG. 2 is a cross-section on line II—II of FIG. 1, through the clamping assembly of the invention.

The clamping assembly 1 shown in FIGS. 1 and 2 comprises a body 2, e.g. made of cast metal, which includes a passage 3 through which there passes an object to be clamped, e.g. a cable 4. The passage 3 includes two mutually facing plane surfaces 3a and 3b. At least one of the two surfaces 3a and 3b (and preferably both of them) is inclined relative to the longitudinal axis of the passage 3, so that the surfaces converge towards each other.

Two jaws 5a and 5b are disposed in the passage 3. At least one of the two jaws (and preferably both jaws 5a and 5b) is wedge-shaped. A set of rollers 6a or 6b is disposed between each jaw 5a or 5b and the corresponding surface 3a or 3b of the passage 3. The ends of the rollers 6a or 6b in each set are supported and rotatably mounted in corresponding frames 7a or 7b. Each of the frames 7a and 7b comprises two plates 8 and 9 which extend in the longitudinal direction of the passage 3, and two cross-members 11 and 12 which are rigidly fixed to the plates 8 and 9. As shown in FIG. 2, at least one of the two plates 8 and 9 of each of the two frames 7a and 7b, e.g. the plate 8, is a channel-section member and overlaps the adjacent longitudinal edges of two plates 13 and 14 which are fixed respectively to the body 2 and to the adjacent jaw 5a or 5b. The plates 13 or 14 are made of a metal which is harder than that constituting the body 2 and the jaws 5a and 5b, and they constitute rolling surfaces for the rollers 6a or 6b. Because of the channel sections of the plates 8 in the frames 7a and 7b, each of the plates 8 holds the corresponding jaw 5a or 5b at a constant distance from the corresponding surface 3a or 3b of the passage 3 through the body 2, while still allowing each of the two frames 7a and 7b to slide relative to the corresponding jaw 5a or 5b and relative to the body 2 in a direction parallel to the direction of longitudinal movement of each of the jaws.

All of the components of the clamping assembly 1 as described above are well known, and there is therefore no need to describe them in greater detail.

In the embodiment shown in FIGS. 1 and 2, each jaw 5a or 5b includes a cylindrical hole 15 whose axis runs parallel to the rolling path defined by the set of rollers 6a or 6b associated with the jaw. A helical compression spring 16 is disposed in each of the two cylindrical holes 15. Although each hole 15 could be a blind hole, it preferably extends along the entire length of the corresponding jaw 5a or 5b and is tapped over a portion 15a of its length as shown in FIG. 1 with respect to the jaw 5a. A threaded plug 17 is screwed into the tapped portion 15a of the hole 15 in each of the two jaws 5a and 5b. One of the ends of each of the two springs 16 bears against the corresponding plug 17, and the opposite end thereof bears against an opposing thrust surface 18 provided at one end of the frame 7a or 7b.

As shown in FIG. 2, the cylindrical hole 15 in each of the two jaws 5a and 5b may be formed, for example, close to one of the two longitudinal sides of the frame 7a or 7b, e.g. close to the plate 8 of said frame. Under such conditions, the plate 8 may include a bracket-shaped extension 19 at one of its ends having a folded portion 21 facing the cylindrical hole 15 and constituting the said opposing thrust surface 18, as shown in FIG. 1. A guide rod 22 is preferably fixed at one end to the folded portion 21 of the extension 19 in each of the two frames 7a and 7b, and the rod 22 is axially engaged, with radial clearance, in the cylindrical hole 15 of the corresponding jaw 5a or 5b. Although not absolutely essential, each of the two plugs 17 may also be extended by a guide rod 23 extending from the plug towards the rod 22, as shown in FIG. 1. Each of the two compression springs 16 is disposed coaxially about the rods 22 and 23. The prestress in each of the two springs 16 may be adjusted by screwing the plug 17 to a greater or lesser extent into the tapped portion 15a of the hole 15 is the corresponding jaw 5a or 5b. The plate 8 in each of the two frames 7a and 7b has a notch at one of its ends forming a stop catch 24 which may come into contact with an abutment 25 provided on the body 2. As shown in FIG. 1, the abutment 25 may be constituted, for example, by the head of a screw which is screwed into a tapped hole provided in the body 2.

With the arrangement described above, it is clear that each of the two springs 16 urges the portion 21 of the corresponding frame 7a or 7b, and thus the frame itself, in the direction of arrow F until the stop catch 24 of the frame makes contact with the abutment 25. Simultaneously, each spring 16 pushes the corresponding jaw 5a or 5b in the opposite direction to the arrow F, such that each jaw comes into contact with the cable 4. The clamping assembly 1 is then ready for operation. If the body 2 of the clamping assembly 1 is displaced in the direction of the arrow F by appropriate actuator means, e.g. two hydraulic actuators (not shown) whose piston rods are fixed to respective side lugs 2a and 2b on the body 2 (FIG. 2), then the two jaws 5a and 5b are held by the cable 4 because of the friction between the cable and the jaws, thereby causing the jaws to be pressed firmly against the cable by the body 2 because of the sloping surfaces 3a and 3b of the passage 3 and because of the relative movement between the body 2 and the two jaws 5a and 5b. Under these conditions, the clamping assembly 1 entrains the cable 4 therewith in the direction of arrow F. Conversely, displacement of the body 2 in the opposite direction to the arrow F, or displacement of the cable 4 in the direction of the arrow F would give rise to relative movements between the body 2 and the two jaws 5a and 5b such that the two jaws release the cable and can therefore slide thereover.

When necessary, a single-acting hydraulic actuator 26 can then be provided to control the jaws positively in such a manner that when the actuator 26 is actuated, the jaws 5a and 5b are thrust in the direction of arrow F against the return force of the springs 16, thereby moving them far enough away from the cable 4 to allow it to pass freely between the jaws without friction. As shown in FIG. 2, the actuator 26 may advantageously be disposed in the passage 3 in a cavity 27 formed between the two jaws 5a and 5b. For example, the cylinder 26a may be fixed at 28 to the body 2 and the piston rod 26b of the actuator 26 may act via a thrust member 29 on a shoulder 31 formed on each of the two jaws 5a and 5b so as to thrust the two jaws in the direction of arrow F when the actuator 26 is actuated. It may be observed that when the hydraulic pressure is released in the actuator 26, then the effect of the spring 16 is to push the piston rod 26 back into the cylinder 26a.

In FIG. 1, the jaw 5a is shown in a position where it is clamping the cable 4, whereas the jaw 5b is shown in a position where it releases the cable 4. However, in practice, the two jaws 5a and 5b are coupled together in conventional manner, e.g. by a coupling strip 32 so that they are simultaneously either in the clamping position or else in the cable release position.

Naturally, the embodiment of the invention described above is given purely by way of example and is not limiting, and numerous modifications may easily be applied thereto by the person skilled in the art without going beyond the scope of the present invention. Thus, for example, the plate 9 in each of the two frames 7a and 7b may be identical to the plate 8, and instead of being located close to the plate 8, the cylindrical hole 15 may be formed close to the plate 9. Alternatively, a cylindrical hole 15 may be formed close to each of the two plates 8 and 9 in each of the two jaws 5a and 5b, with a spring 16 then being disposed in each of the two holes 15 in each jaw.

I claim:

1. A clamping assembly with self-clamping jaws, said assembly comprising:
   (a) a body having an elongate passage which, in use receives an elongated object to be clamped, said passage having two mutually facing surfaces with at least one of said surfaces being inclined to the longitudinal axis of said passage;
   (b) a pair of jaws, at least one of which is wedge-shaped, said jaws being mounted to move generally longitudinally in said passage between a first position in which the jaws clamp said object and a second position in which they release the object;
   (c) a set of rollers disposed between each jaw and a respective one of the two mutually facing surfaces of said passage to form a rolling path for the associated jaw, the rollers in each set being supported and rotatably mounted at their ends in a mounting frame capable of sliding movement relative to the corresponding jaw and relative to said body in a direction parallel to the longitudinal direction of the movement of the corresponding jaw; and (d) a helical compression spring interposed between each jaw and the mounting frame of the associated set of rollers, each spring bearing at one end against the associated jaw to urge it towards its first position and at its other end against an opposing thrust surface provided at one end of said mounting frame to urge the mounting frame into contact with an abutment provided on said body, (e) and wherein each jaw includes a cylindrical hole whose axis lies parallel to the rolling path defined by the set of rollers associated with the jaw, and the helical compression spring is disposed inside the said cylindrical hole.

2. A clamping assembly according to claim 1, wherein said cylindrical hole is formed in the jaw close to a longitudinal side of the mounting frame, and wherein the said longitudinal side of the mounting frame includes a bracket-shaped extension having a folded portion facing said cylindrical hole and forming said opposing thrust surface.

3. A clamping assembly according to claim 2, wherein a guide rod is fixed at one end to the folded portion of the extension of the mounting frame and is axially engaged with radial clearance inside said cylindrical hole, the compression spring being disposed coaxially around said rod.

4. A clamping assembly according to claim 1, wherein the said cylindrical hole extends over the entire length of the jaw and is tapped over a portion of its length, and wherein a threaded plug is screwed into the tapped portion of the cylindrical hole to adjust the prestress of said compression spring.

* * * * *